United States Patent [19]
Hadbavny

[11] Patent Number: 5,201,488
[45] Date of Patent: Apr. 13, 1993

[54] TELESCOPING TUBULAR BODY

[76] Inventor: David L. Hadbavny, P.O. Box 283, Westmoreland City, Pa. 15692

[21] Appl. No.: 289,256

[22] Filed: Dec. 23, 1988

[51] Int. Cl.$^5$ ............................................. E04H 17/00
[52] U.S. Cl. ................................ 248/354.5; 248/200.1
[58] Field of Search ............... 248/354.5, 200.1, 354.1, 248/352, 188.5

[56] References Cited

U.S. PATENT DOCUMENTS

| | | | |
|---|---|---|---|
| 2,594,605 | 4/1952 | Zoppelt | 248/200.1 X |
| 3,062,157 | 11/1962 | Woods | 248/354.5 X |
| 3,519,293 | 7/1970 | Henning et al. | 248/200.1 X |
| 3,822,850 | 7/1974 | Elias | 248/200.1 X |

FOREIGN PATENT DOCUMENTS 638 1/1904 United Kingdom ............. 248/200.1

Primary Examiner—Alvin C. Chin-Shue
Attorney, Agent, or Firm—H. Keith Hauger

[57] ABSTRACT

A telescoping tubular body consisting of two tubular sections which are secured to each other by a simple spring and pin assembly to attain adjustable lengths between two opposing objects. Feet are located at each end of the tubular body to properly distribute pressure to a surface without disturbing same. These feet are interchangeable with other tools to make this invention flexible for a multitude of purposes.

1 Claim, 2 Drawing Sheets

TELESCOPING TUBULAR BODY

BACKGROUND OF THE INVENTION

1. Field of the Invention

This invention relates generally to a telescoping tubular body having adjustable lengths for use as a means for holding vehicle pedals, doors, hood lids, trunk lids, other masses spaced apart and the like.

2. Description of the Prior Art

The within described invention represents an improvement over the holding devices in the prior art because of its simple and unique construction.

One previous holding device, Hawkins U.S. Pat. No. 2,671,355 uses two extensible rods which combine with a plate and helical spring to hold two masses spaced apart. A second type of brace rod is shown in Hedeen U.S. Pat. No. 2,820,626. This invention comprises two extensible male and female rods and is secured at variable lengths by a combination of latch hooks, torsion springs and a larger compression spring that encircles a rod. Another concept is explored by Dunham U.S. Pat. No. 3,722,266 which is entitled a brake bleeding tool. This consists of the familiar two interacting tubes and is capable of exerting a force on opposing masses by use of a compression coil spring in one hollow tube and a stop collar attached to the outside of the second and male tube. A last concept is shown in Staples U.S. Pat. No. 3,355,136. This represents a different type of invention because it provides vertical support for a raised mass like a vehicle. It uses two rods and a pin mechanism for sliding into a series of holes with compressive forces exerting a force on this support device.

SUMMARY OF THE INVENTION

It is, therefore, an object of the present invention to hold vehicle pedals like accelerators, brake pedals, clutch pedals allowing a mechanic or other individual to move away from the area and alleviating the necessity of a helper. There are an infinite number of circumstances when it is necessary to hold two objects apart or exert pressure between them, including but not limited to holding a door, window, trunk lid or hood when it is impossible to be at the site and no assistance is available. There are also instances where this invention may be used to exert pressure on an item that is to be glued to another surface.

It is the further object of the invention to provide a holding device that has adjustable lengths and won't damage or mar the surface or finish of any material it contacts.

It is the further object of the invention to provide a holding device with the least possible working parts that is inexpensive to manufacture, easy to use, maintain, and easy to carry and store.

It is the further object of the invention to help keep the inside of a car clean because a person sitting in the vehicle performing the same function may often convey dirt and grease to the upholstering and other surfaces.

It is the further object of the invention to made the ends or feet interchangeable with other items like an ice scraper, snow brush or other useful tool that may require the adjustable lengths.

It is the further object of the invention to assist a bus driver, truck driver or other individual caught in an emergency situation without assistance when it is necessary to check a tail light or hold open a door, lid or the like.

More specifically, the present invention is a telescoping tubular body having adjustable lengths for use as a means of holding vehicle pedals, doors, hood lids, trunk lids, other masses spaced apart and the like; comprising a male section having a first end and a second end; a female section suitable for receiving said male section axially having a first end and a second end; a spring means located inside said male section for securing said male section and said female section at variable lengths; a female foot means located at said second end of said female section for bracing said telescoping tubular body at said second end of said female section; a male foot means located at said first end of said male section, longitudinally opposed to said female foot means, for bracing said telescoping tubular body at said first end of said male section.

These objects, as well as other objects and advantages of the present invention, will become apparent from the following description, in reference to the illustrations appended hereto.

BRIEF DESCRIPTION OF THE DRAWINGS

For a better understanding of the invention, reference may be had to the accompanying drawings, in which.

DESCRIPTION OF PREFERRED EMBODIMENTS

Figure 1:
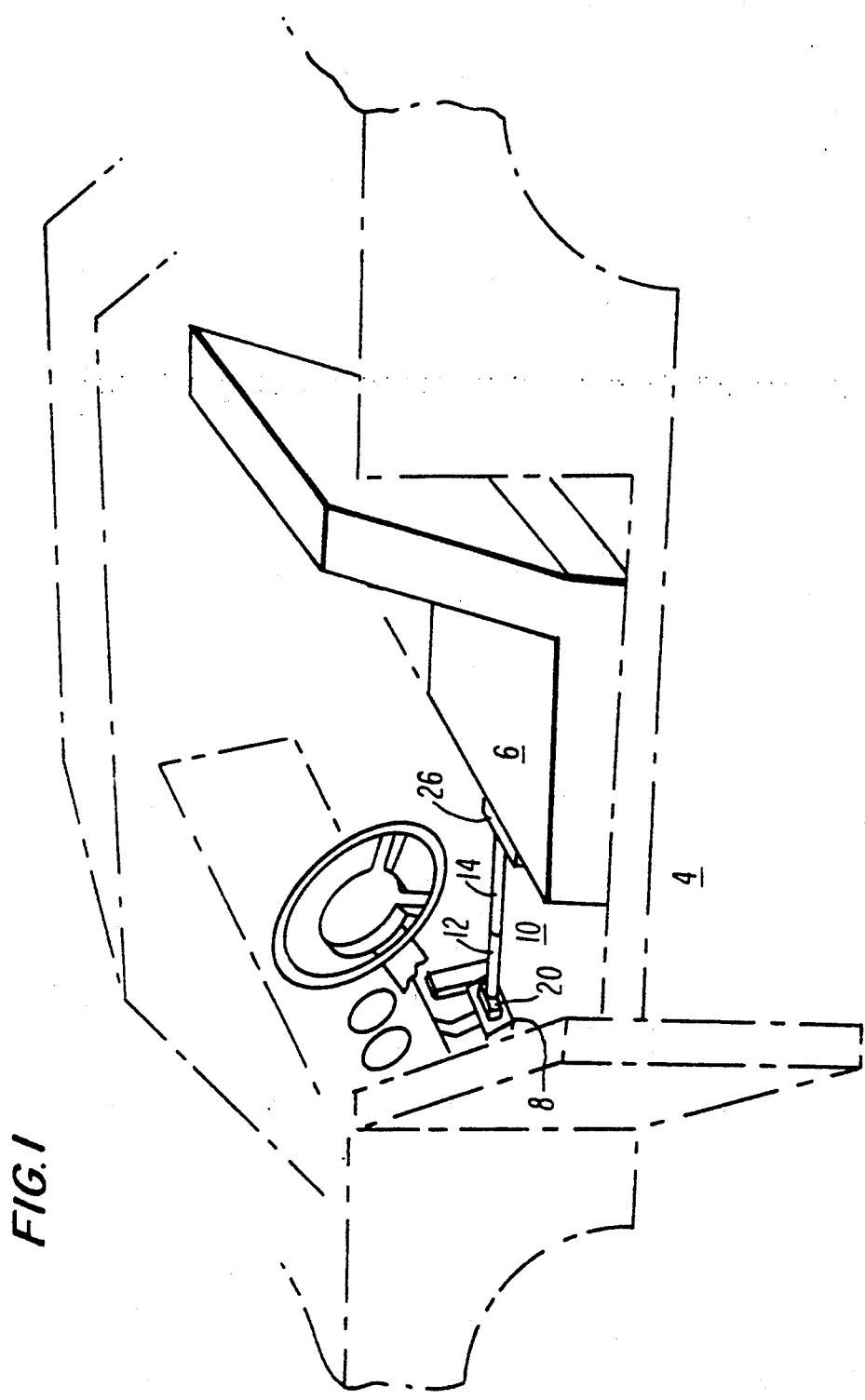
FIG. 1 is a perspective view of a telescoping tubular body shown in a vehicle operating to exert pressure between the seat and pedal.
Figure 2:
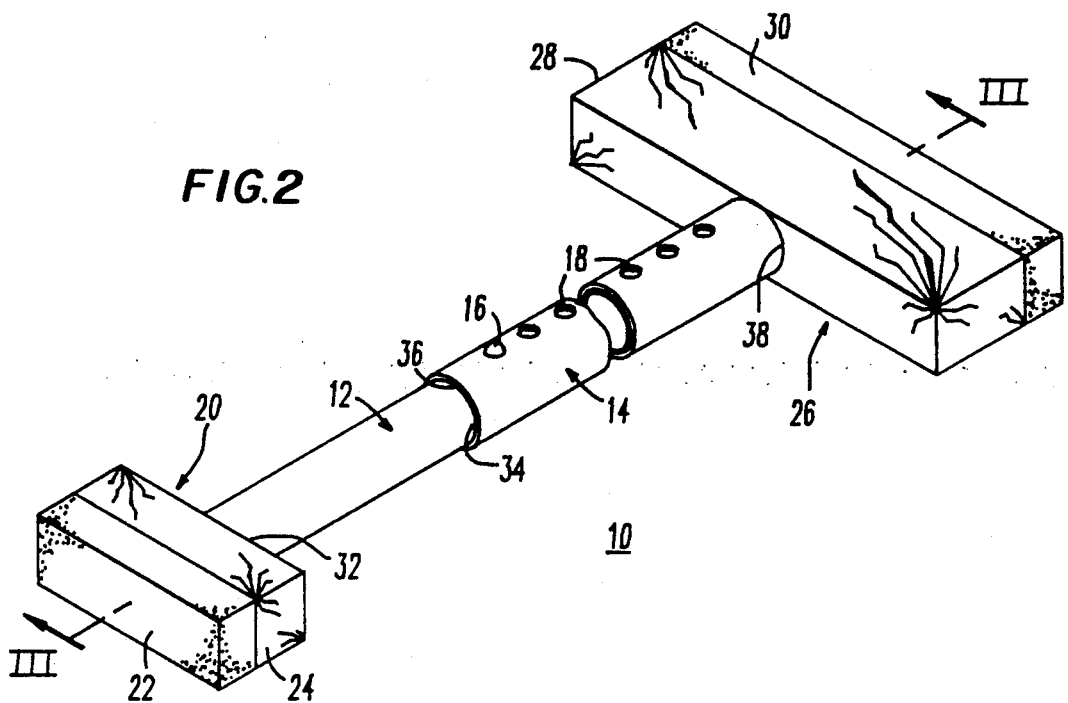
FIG. 2 is a perspective view of a telescoping tubular body in an extended position and showing some of its parts.

Referring to the drawings, FIG. 1 is a perspective view of a telescoping tubular body 10, positioned between a vehicle seat 6 and a vehicle pedal 8 to exert a force on vehicle pedal 8 to test or check brakes, tail lights, clutches, accelerators and make adjustments thereto without the necessity of being inside the vehicle. Telescoping tubular body 10 consists of a male section 12 which slides into a female section 14 and is adjusted to various lengths by depressing a pin 16 as shown in FIG. 2. Telescoping tubular body 10 has male foot means 20 which is cushioned against vehicle pedal 8 and female foot means 26 which is likewise cushioned against vehicle seat 6 as shown in vehicle 4. Telescoping tubular body 10 is preferably constructed from hollow cylindrical tubing of steel, aluminum or plastic material.

Telescoping tubular body 10 may easily be used as a means to hold a car door open to a specified position, or a trunk lid, hood or in any case where it is necessary to exert a force between two surfaces or objects. The within described invention is especially helpful to a mechanic as it alleviates the necessity of a helper in many instances.

Figure 3:
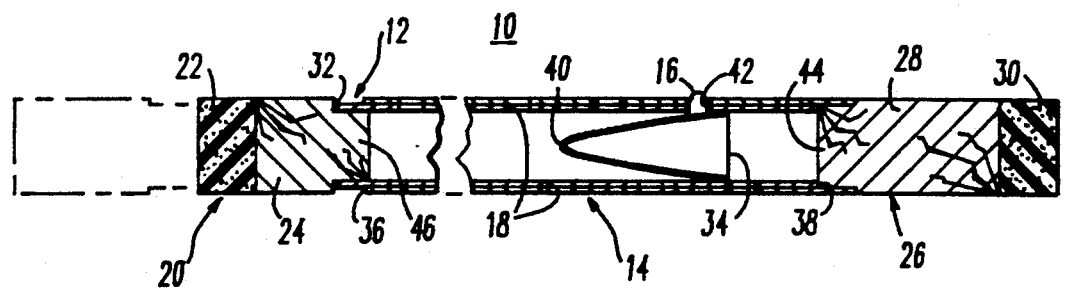
FIG. 3 is a cross sectional side elevation view of a telescoping tubular shown in extended and retracted position.

FIG. 2 illustrates telescoping tubular body 10 in further detail. Male section 12 has first end of male section 32 where male foot means 20 is press fit and second end of male section 34 where pin 16 protrudes through pin opening 42 (as shown in FIG. 3) for engagement in a plurality of spaced openings 18 located diametrically parallel to each other in said female section 14. Male foot means 20 consists of structural section 24, having a protrusion 46 which fits into first end of male section 32, said structural section 24 preferably constructed from wood or plastic. Cushioning means 22 is glued to the end of structural section 24 to cushion pressure exerted on a surface, to allow a margin of flexibility, and to prevent marring or scratches. Cushioning means 22 is preferably constructed from sponge or rubber.

Likewise, female section 14 has a first end of female section 36 for insertion of second end of male section 34 which is of less diameter. Female foot means 26 consists of structural section 28 having a protrusion 44 which fits into second end of female section 38, said structural section 26 preferably constructed from wood or plastic. Cushioning means 30 is glued to the end of structural section 26 and has the same purpose and specifications as aforesaid for cushioning means 22.

Telescoping tubular body 10 is cut axially at III—III to obtain a cross sectional side elevation view as shown in FIG. 3. Pin 16 is brazed or riveted to spring 40 enabling these components to act together when pin 16 is depressed and male section 12 slides through female section 14 to attain variable desired lengths. Spring 40 is preferably a leaf spring which maintains a static position on the inside diameter of male section 12 by the pressure it exerts therein and by pin 16 protruding through pin opening 42. Spring 40 may alternatively be a vertically placed helical spring.

Although the preferred means of securing male foot means 20 and female foot means 26 to telescoping tubular body 10 is by fit press, these feet may be threaded to fit a thread inside male section 12 and female section 14, respectively. Thereby, various other items like an ice scraper, snow brush or other tool could be inserted to said telescoping tubular body interchangeably. This makes telescoping tubular body 10 very useful, especially as a device to be easily stored in a vehicle and having an extensible reach for larger vehicles which are higher, wider and longer than a traditional automobile.

It is noted in FIG. 3 that spaced openings 18 actually have two locations, first as shown in FIG. 2 and then diametrically 180 degrees therefrom as shown in FIG. 3. Spaced openings 18 on the top of female section 18 are ajar to spaced openings 18 on the bottom of female section 14. The telescoping tubular body 10 is capable of adjustment to twice as many lengths and the length of telescoping tubular body 10 is capable of being more precisely selected because of the aforesaid arrangement.

The dotted line shown in FIG. 3 indicates an extended length of telescoping tubular body 10, whereas the solid lines are drawn to show a retracted position of telescoping tubular body 10.

In accordance with the provisions of the Patent Statutes, we have explained the principle and operation of our invention and have illustrated and described what we consider to represent the best embodiment thereof.

I claim:

1. A telescoping tubular body having adjustable lengths for use as a means of holding vehicle pedals, doors, hood lids, trunk lids, other masses spaced apart and the like, comprising:

a male section having a first end and a second end;

a female section suitable for receiving said male section axially having a first end and a second end, wherein said female section has a plurality of diametrically parallel spaced openings for engagement of a pin secured to a spring means, said pin capable of passing through said openings to enable said telescoping tubular body to extend or retract to variable lengths;

said plurality of diametrically parallel spaced openings consist of a first row and 180 degrees therefrom a second row located ajar to said first row making said telescoping tubular body more capable of length adjustment;

said spring means being located inside said male section for securing said male section and said female section at variable lengths, wherein said spring means is a leaf spring located on an inside diameter of said male section, said pin vertically secured to said leaf spring for passage through said plurality of diametrically parallel spaced openings, such that by depressing said pin and sliding said male section through said female section, said telescoping tubular body is capable of said variable lengths and is structurally capable of transmitting an axial force through a male foot means and a female foot means to outside opposing masses;

said female foot means being located at said second end of said female section for bracing said telescoping tubular body at said second end of said female section;

said male foot means being located at said first end of said male section, longitudinally opposed to said female foot means for bracing said telescoping tubular body at said first end of said male section.

* * * * *